Jan. 31, 1956 E. A. RICHARDSON 2,732,710
THERMISTOR BRIDGE FOR MOISTURE DETERMINATION
Filed May 1, 1953
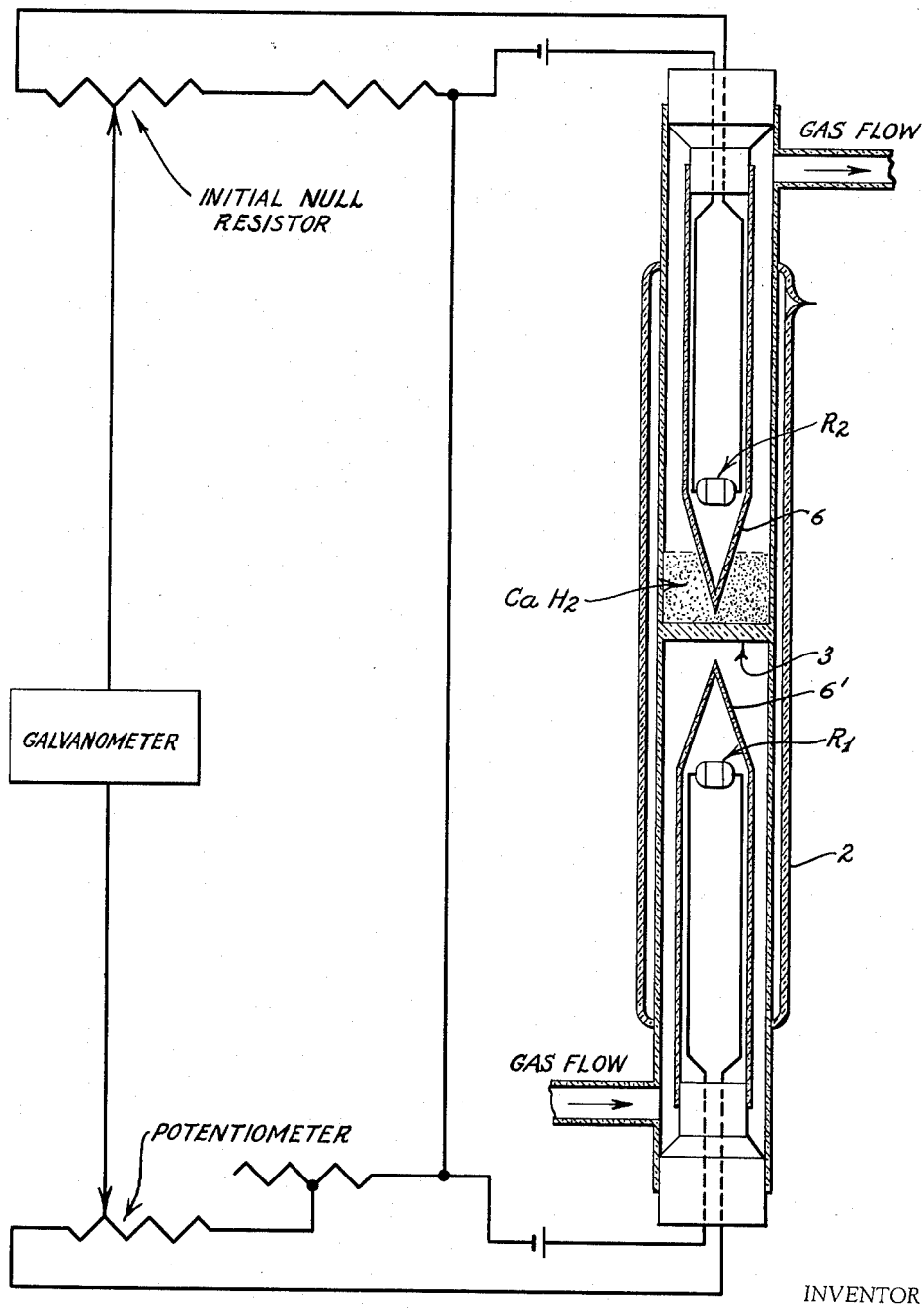
INVENTOR
EDWIN A. RICHARDSON
BY Beale and Jones
ATTORNEYS

United States Patent Office 2,732,710
Patented Jan. 31, 1956

2,732,710

THERMISTOR BRIDGE FOR MOISTURE DETERMINATION

Edwin A. Richardson, Sulphur, La., assignor to Columbia-Southern Chemical Corporation, Allegheny County, Pa., a corporation of Delaware Application May 1, 1953, Serial No. 352,493

2 Claims. (Cl. 73—29)

This invention relates to an improvement in thermistor bridges which are adapted for use in the determination of water vapor in gases.

For making a quantitative determination of water vapor in a wet gas, where the gas is relatively high in humidity, crude determinations by absorption with a drying agent, such as calcium chloride, are sufficiently accurate. Where the water is present as a trace impurity, in a "dry" gas, more refined methods are necessary. Harris and Nash developed a thermistor bridge for this purpose, which is described in Analytical Chemistry, vol. 23, No. 5, May 1951, at pages 736 to 739. Their device comprised a reaction cell or unit having a glass tube housing the thermistor bridge. The glass tube was vertically disposed with a gas inlet at the lower end and a gas outlet at the upper end. Centrally disposed within the tube was a fine mesh screen, upon which were placed calcium hydride fragments. As gas passed upwardly through the tube, any moisture in the gas reacted with the calcium hydride. The heat of reaction generated by this water absorption was sufficient to change the temperature of the gas. To measure this temperature change, a thermistor was disposed directly below the screen, and a second thermistor was disposed directly above the screen. The difference in the temperature of the two thermistors was measured by a simple electrical bridge, which could be calibrated to read directly in the water content of the gas.

With this type of instrument, accurate determinations of vapor content may be made where the vapor content is as low as 0.001% to 0.1% by volume. Although this instrument filled a gap in the art, and represented a tremendous advance over prior methods of analysis, it is only natural that several disadvantages should appear.

A chief disadvantage of the basic thermistor bridge is that it deteriorates rapidly when used with corrosive gases. Chlorine is particularly destructive of the leads and of the thermistors themselves, even though water vapor is present in a relatively minute amount. The corrosion of the parts is so rapid as to prevent accurate calibration and use of the bridge. Other serious disadvantages are also inherent in the usual bridge. For instance, solid particles which are carried along by the gas stream tend to coat the thermistors and leads. This coating on the thermistors acts as an insulating layer and changes the electrical characteristics of the bridge.

Another fundamental disadvantage becomes evident whenever a fresh charge of calcium hydride is placed in the reaction unit. If the upper thermistor is not returned to its original position, the calibrations will not be stable from one charge to another. It therefore is necessary to recalibrate the unit each time a fresh charge of calcium hydride is placed in the unit.

The object of this invention is to develop an improved thermistor bridge which will overcome the disadvantages of the prior art. Thus, it is an object of the invention to develop a thermistor bridge which may be used for determination of trace water vapor in corrosive gases. Another object of the invention is to devise a thermistor bridge in which the thermistor elements are protected against deposits of material from the gas stream. A further object of the invention is to produce a thermistor which may be disassembled for cleaning, or for recharging with calcium hydride or other material, without the necessity of recalibrating the bridge.

These and other improvements over the instruments now known are achieved by two basic improvements in the reaction unit. First, each thermistor, with its leads, is enclosed in a closed glass envelope. Secondly, a sintered glass plate is permanently positioned in the reaction unit as a support for the calcium hydride. The sintered glass plate provides a stationary reference point for the upper thermistor, thus avoiding the necessity for recalibrations after disassembly. These and other features of the improved unit can be best understood by reference to the drawing.

The drawing shows a schematic view of the improved reaction unit, including a diagram of the accompanying electrical circuit.

A gas sample is drawn off from the main gas stream which is to be analyzed by usual means, such as a flow controller consisting of a diaphragm valve and an orifice. The gas sample flows upwardly in the reaction unit through a container tube 1. As the gas streams up the tube its temperature is measured by a first or lower thermistor $R_1$. A sintered glass plate 3 is permanently secured within the tube 1 and supports the calcium hydride fragments. As the gas flows through the plate 3 and the bed of calcium hydride, any water vapor in the gas is absorbed by the calcium hydride. The resulting heat of reaction warms the gas, and the elevated gas temperature is measured by a second or upper thermistor $R_2$. The gas then leaves the tube at the top.

Individual glass envelopes 6 and $6^1$ completely surround and protect each thermistor $R_2$ and $R_1$, respectively. These envelopes $6^1$ and 6 are formed of thin-walled glass tubing by drawing the tubing into a conical point, as shown. The open end of the glass tubing slips over the end of a supporting rubber stopper 5 or $5^1$, thus forming an air-tight seal for each thermistor. The glass envelope 6 is preferably of such a length that the apex of the cone may be adjusted so as to rest against the sintered plate 3, by sliding the open end of the envelope along the shank of its rubber stopper. The plate 3 thus forms a stationary, permanent reference point for positioning the second or upper thermistor $R_2$.

Although the thermistors are very sensitive, the heat changes in the reaction unit are of a low order. It is therefore necessary to insulate the tube carefully against heat loss or gain. To this end, an evacuated jacket 2 surrounds the inner tube 1. This jacket is silvered on its interior surface. In the areas of the inner tube 1 which are not thus jacketed, asbestos tape or other insulating material may be wound.

The supporting rubber stoppers 5 and $5^1$ serve a dual purpose. Their principal function is to close the ends of the inner tube 1. Another function is to provide a shank upon which the glass envelopes 6 and $6^1$ may be adjusted, and to seal the glass envelopes as well. The stoppers also provide gas-tight conduits through which the electrical leads from the thermistors are passed.

The electrical circuit is shown only in its barest essentials. The two resistances may be engineered to produce any given ratio and sensitivity desired. The particular circuit used will vary from installation to installation, depending on the results and sensitivity desired and the equipment available.

The enclosed thermistor system just described has many advantages over the apparatus in which no enclosure is used. One advantage is that there is no contact between the thermistor and the test sample of gas. There is therefore no coating of the thermistor or its lead wires with solids from the gas. If the glass envelope is coated, it is much more simple to clean and replace than the thermistor and the lead wires. Furthermore, since the glass envelope presents a larger surface than does the thermistor, a proportionately larger amount of solids would be necessary to coat and insulate the glass envelope than would be necessary for the unprotected thermistor. It is thus possible to operate successfully over a larger period of time with the protected thermistor system. In practice it has been found that if the glass envelopes are cleaned whenever the calcium hydride charge is replaced, there is no problem of deposition of solids. The glass enclosures also have the more obvious function and advantage of preventing any corrosion of the thermistor. The conical taper on the end of the envelope also has the advantage of producing an even, smooth gas flow around the envelope so that there tends to be an even heat distribution.

The sintered glass plate 3 is preferably permanently affixed to the inner tube 1. Its evenly-porous structure creates an even flow of gas up the tube and around the upper glass envelope 6. There is less likelihood of channeling in the calcium hydride with the sintered glass plate than with a screen.

Probably the most attractive feature of the improved reaction unit, aside from the absence of corrosion, is the stability of calibrations. With this improved unit it is possible to renew the charge of hydrde and return the enclosed upper thermistor $R_2$ to its original position by adjusting the tip of the upper glass enclosure envelope 6 to just touch the sintered glass plate 3. The upper thermistor $R_2$ is never removed from its enclosing envelope 6, so the position of the thermistor is never changed, and thus the calibrations will remain constant from one charge of hydride to another. It is, of course, equally important that the position of the charge of hydride remain unchanged, and the permanently positioned sintered glass plate 3 fulfills this function. The sintered glass plate 3 serves as the stationary reference point for the hydride and the thermistor.

It will be obvious that many specific embodiments of the reaction unit are possible. The two important innovations disclosed herein are the enclosed thermistor system and the sintered glass filter plate. Based upon these two improvements, a wide variety of reaction units may be built to suit the needs of particular installations. One specific embodiment of the invention is described in the following example.

Example

In a reaction unit designed for operation with chlorine gas which has been dehydrated with sulfuric acid, corrosion resistance is of primary importance. It is essential that the thermistors be enclosed in gas-tight envelopes. To construct a suitable unit, a Western Electric 17A thermistor was connected with extended leads. The leads were passed through a rubber stopper. Over the thermistor and over the small end of the rubber stopper was placed a length of 9 mm. diameter glass tubing, with a wall thickness of about 1 mm. The fit between the stopper and glass tubing was an air-tight fit. The open end of the glass tubing was then heated and stretched to thin out the wall, and was then drawn to a point, forming a cone with a thin glass wall. The stretching of the tubing was controlled so that the final length of the tube was such that when inserted in an insulated tube provided with a medial sintered glass plate, the tip of the cone rested gently upon the glass plate.

The sealing of the tube by forming the cone completed the enclosure of the thermistor. It could no longer come in direct contact with the chlorine.

The second thermistor was made in the same way. The use of rubber stoppers allowed for some free play and compensated for minor inaccuracies in the length of the glass envelopes.

In other respects, the reaction unit conformed to that described by Harris et al. in the article cited above.

The use of calcium hydride as the water absorption agent has been disclosed, but other deliquescent substances could be used. These form no part of the invention, however, since the invention disclosed and claimed resides in the novel structure of the reaction unit. While the disclosure states that the porous plate is of sintered glass, other porous materials could be used. Glass is more easily handled than most other substances which could be used. The critical feature is the use of a permanently positioned, porous plate. Materials other than glass could also be used for the thermistors. For instance, various synthetic plastic materials could be used.

I claim as my invention:

1. In a moisture detector bridge particularly adapted for use with corrosive gases, including a tubular gas conduit, a first thermistor disposed within the conduit, a hygroscopic material capable of liberating detectable amounts of heat energy disposed across the gas flow downstream of said first thermistor, and a second thermistor disposed within the conduit downstream of said hygroscopic substance, a terminal of each thermistor being electrically connected to the opposite ends respectively of a circuit including a variable resistance and a power source, and the other terminal of each thermistor being electrically connected with an electrical measuring instrument disposed to indicate electrical balance between a first circuit including one of said thermistors and a measurable resistance and a second circuit including the other thermistor and a measurable resistance, the improvement in structure comprising a permanently positioned plate of sufficient porosity to allow a sample gas flow through said conduit, the porosity of the plate being substantially uniform so as to produce an even flow of gas on the downstream side of the plate, said plate being positioned within said conduit between said thermistors as a support member for said hygroscopic substance, an envelope of inert material enclosing each thermistor, an end of said envelope being a known distance from said thermistor, the envelope enclosing the downstream thermistor being precisely repositionable with respect to said plate during assembly of said moisture detector bridge by abutment of said end of the envelope enclosing said downstream thermistor against said plate.

2. In a moisture detector bridge particularly adapted for use with corrosive gases, including a tubular gas conduit, a first thermistor disposed within the conduit, a hygroscopic material capable of liberating detectable amounts of heat energy disposed across the gas flow downstream of said first thermistor, and a second thermistor disposed within the conduit downstream of said hygroscopic substance, a terminal of each thermistor being electrically connected to the opposite ends respectively of a circuit including a variable resistance and a power source, and the other terminal of each thermistor being electrically connected with an electrical measuring instrument disposed to indicate electrical balance between a first circuit including one of said thermistors and a measurable resistance and a second circuit including the other thermistor and a measurable resistance, the improvement in structure comprising a permanently positioned plate of sintered glass of sufficient porosity to allow a sample gas flow through said conduit, the porosity of the sintered glass plate being substantially uniform so as to produce an even flow of gas on the downstream side of the plate, said plate being positioned within said conduit between said thermistors as a support member for said hygroscopic substance, an envelope of inert material enclosing each thermistor, an end of said envelope being a known distance from said thermistor, the envelope of each thermistor being precisely repositionable with respect to the sintered glass plate during assembly of said moisture detector bridge by abutment of said end of the envelope enclosing each thermistor against the sintered glass plate.

References Cited in the file of this patent

UNITED STATES PATENTS

| | | |
|---|---|---|
| 2,143,775 | Hertel | Jan. 10, 1939 |
| 2,143,795 | Okey | Jan. 10, 1939 |
| 2,623,391 | Malecki | Dec. 30, 1952 |

FOREIGN PATENTS

| | | |
|---|---|---|
| 558,299 | Great Britain | Dec. 30, 1943 |
| 597,420 | Great Britain | Jan. 26, 1948 |

OTHER REFERENCES

Article—Harris and Nash—published in "Analytical Chemistry," vol. 23, Nov. 5, May 1951, pp. 736–739.